(12) United States Patent
Patel et al.

(10) Patent No.: US 10,591,164 B2
(45) Date of Patent: Mar. 17, 2020

(54) FUEL NOZZLE FOR A GAS TURBINE ENGINE

(71) Applicant: General Electric Company, Schenectady, NY (US)

(72) Inventors: Nayan Vinodbhai Patel, Cincinnati, OH (US); Duane Douglas Thomsen, Cincinnati, OH (US)

(73) Assignee: General Electric Company, Schenectady, NY (US)

( * ) Notice: Subject to any disclaimer, the term of this patent is extended or adjusted under 35 U.S.C. 154(b) by 291 days.

(21) Appl. No.: 14/645,959

(22) Filed: Mar. 12, 2015

(65) Prior Publication Data
US 2016/0265780 A1 Sep. 15, 2016

(51) Int. Cl.
*F23R 3/14* (2006.01)
*F23R 3/34* (2006.01)
*F23R 3/28* (2006.01)

(52) U.S. Cl.
CPC .............. *F23R 3/343* (2013.01); *F23R 3/14* (2013.01); *F23R 3/283* (2013.01); *F23R 3/286* (2013.01); *F23R 3/34* (2013.01); *Y02T 50/675* (2013.01)

(58) Field of Classification Search
CPC .... F23R 3/14; F23R 3/286; F23R 3/28; F23R 3/283; F23R 3/343
See application file for complete search history.

(56) References Cited

U.S. PATENT DOCUMENTS

| 3,618,319 A | 11/1971 | Kydd |
| 3,631,675 A | 1/1972 | Keiter et al. |
| 3,866,413 A | 2/1975 | Benisek |

(Continued)

FOREIGN PATENT DOCUMENTS

| CA | 2891128 A1 * | 5/2014 | ............... F23R 3/14 |
| CN | 1519466 A | 8/2004 | |

(Continued)

OTHER PUBLICATIONS

European Seach Report and Opinion issued in connection with corresponding EP Application No. 16159179.9 dated Jul. 25, 2016.

(Continued)

*Primary Examiner* — William H Rodriguez
*Assistant Examiner* — Thomas P Burke
(74) *Attorney, Agent, or Firm* — General Electric; Pamela Kachur

(57) ABSTRACT

A fuel nozzle apparatus for a gas turbine engine includes: an annular outer body extending parallel to a centerline axis, with an exterior surface having a plurality of openings; a main injection ring disposed inside the outer body and including: a circumferential main fuel gallery; and a plurality of main fuel orifices, each main fuel orifice communicating with the main fuel gallery and aligned with one of the openings; a venturi disposed inside the main injection ring; an annular splitter disposed inside the venturi, and including inner and outer walls spaced-apart from each other defining a splitter cavity, and a plurality of discharge holes communicating with the splitter cavity; an array of outer swirl vanes extending between the venturi and the splitter; a pilot fuel injector within the splitter; and an array of inner swirl vanes extending between the splitter and the pilot fuel injector.

20 Claims, 6 Drawing Sheets

(56) References Cited

U.S. PATENT DOCUMENTS

| | | | |
|---|---|---|---|
| 4,083,181 A | 4/1978 | Adamson | |
| 4,139,157 A | 2/1979 | Simmons | |
| 4,798,330 A | 1/1989 | Mancini et al. | |
| 5,201,801 A | 4/1993 | Smith, Jr. | |
| 5,205,117 A | 4/1993 | Shekleton et al. | |
| 5,329,761 A | 7/1994 | Ablett et al. | |
| 6,032,457 A | 3/2000 | McKinney et al. | |
| 6,272,840 B1 | 8/2001 | Crocker et al. | |
| 6,389,815 B1 | 5/2002 | Hura et al. | |
| 6,547,163 B1 | 4/2003 | Mansour et al. | |
| 6,865,889 B2 | 3/2005 | Mancini et al. | |
| 7,596,938 B2 | 10/2009 | Bart et al. | |
| 7,600,370 B2 | 10/2009 | Dawson | |
| 7,878,000 B2 | 2/2011 | Mancini et al. | |
| 8,096,135 B2 | 1/2012 | Caples | |
| 8,365,531 B2 | 2/2013 | Pidcock et al. | |
| 8,387,391 B2 | 3/2013 | Patel et al. | |
| 8,726,668 B2 | 5/2014 | Patel et al. | |
| 2003/0196440 A1* | 10/2003 | Steinthorsson | F23D 11/107 60/776 |
| 2004/0148937 A1* | 8/2004 | Mancini | F23R 3/343 60/740 |
| 2008/0289340 A1* | 11/2008 | Oda | F23R 3/28 60/737 |
| 2008/0302105 A1* | 12/2008 | Oda | F23R 3/28 60/737 |
| 2009/0014561 A1 | 1/2009 | Mcmasters et al. | |
| 2009/0173076 A1* | 7/2009 | Toon | F23D 14/74 60/746 |
| 2009/0255102 A1 | 10/2009 | McMasters et al. | |
| 2009/0255262 A1* | 10/2009 | McMasters | F23R 3/14 60/742 |
| 2010/0050644 A1* | 3/2010 | Pidcock | F23D 11/107 60/737 |
| 2010/0170255 A1 | 7/2010 | Zuo et al. | |
| 2010/0205971 A1* | 8/2010 | Williams | F23D 11/107 60/748 |
| 2010/0251719 A1* | 10/2010 | Mancini | F23R 3/14 60/737 |
| 2010/0263382 A1 | 10/2010 | Mancini et al. | |
| 2010/0269506 A1* | 10/2010 | Nonaka | F23D 11/386 60/742 |
| 2010/0293956 A1 | 11/2010 | Nadkarni | |
| 2010/0308135 A1* | 12/2010 | Yamamoto | F23R 3/343 239/402 |
| 2011/0005189 A1 | 1/2011 | Uhm et al. | |
| 2012/0151928 A1* | 6/2012 | Patel | F23D 11/383 60/737 |
| 2014/0013764 A1 | 1/2014 | Biagioli et al. | |

FOREIGN PATENT DOCUMENTS

| | | |
|---|---|---|
| CN | 1550714 A | 12/2004 |
| CN | 101285592 A | 10/2008 |
| CN | 102052681 A | 5/2011 |
| CN | 102242939 A | 11/2011 |
| CN | 102242940 A | 11/2011 |
| CN | 102261673 A | 11/2011 |
| CN | 102418928 A | 4/2012 |
| CN | 104334972 A | 2/2015 |
| EP | 1045202 A1 | 10/2000 |
| JP | 05187636 A | 7/1993 |
| JP | 05264009 A | 10/1993 |
| JP | 1061954 A | 3/1998 |
| JP | 2005180799 A | 7/2005 |
| JP | 2010159951 A | 7/2010 |
| JP | 2010271035 A | 12/2010 |
| JP | 2011017334 A | 1/2011 |
| JP | 2011208938 A | 10/2011 |
| JP | 2011526995 A | 10/2011 |
| JP | 2014016151 A | 1/2014 |
| WO | 2008071902 A1 | 6/2008 |
| WO | 2014078694 A1 | 5/2014 |

OTHER PUBLICATIONS

Unofficial English Translation of Japanese Search Report issued in connection with corresponding JP Application No. 2016041660 dated Feb. 16, 2017.

Unofficial English Translation of Japanese Office Action issued in connection with corresponding JP Application No. 2016041660 dated Mar. 7, 2017.

Machine Translation and First Office Action and Search issued in connection with corresponding CN pplication No. 201610138298.1 dated Jan. 17, 2018.

\* cited by examiner

FUEL NOZZLE FOR A GAS TURBINE ENGINE

BACKGROUND OF THE INVENTION

The present invention relates to gas turbine engine fuel nozzles and, more particularly, to staged fuel nozzles for gas turbine engines.

Aircraft gas turbine engines include a combustor in which fuel is burned to input heat to the engine cycle. Typical combustors incorporate one or more fuel injectors whose function is to introduce liquid fuel into an air flow stream so that it can atomize and burn.

Staged combustors have been developed to operate with low pollution, high efficiency, low cost, high engine output, and good engine operability. In a staged combustor, the nozzles of the combustor are operable to selectively inject fuel through two or more discrete stages, each stage being defined by individual fuel flowpaths within the fuel nozzle. For example, the fuel nozzle may include a pilot stage that operates continuously, and a main stage that only operates at higher engine power levels. The fuel flowrate may also be variable within each of the stages.

A need with this type of fuel nozzle is to have good cooling of the nozzle components and to minimize the acoustic impact of operation.

BRIEF DESCRIPTION OF THE INVENTION

This need is addressed by the present invention, which provides a fuel nozzle having a splitter with a hollow interior cavity, and optionally including helical or partially-helical swirl vane, and further optionally including a venturi with a compound angle.

According to one aspect of the invention, fuel nozzle apparatus for a gas turbine engine includes: an annular outer body, the outer body extending parallel to a centerline axis, and having an exterior surface extending between forward and aft ends, wherein a plurality of openings pass through the exterior surface; an annular main injection ring disposed inside the outer body, the main injection ring including: a main fuel gallery extending in a circumferential direction; and a plurality of main fuel orifices, each main fuel orifice communicating with the main fuel gallery and aligned with one of the openings of the outer body; an annular venturi disposed inside the main injection ring; an annular splitter disposed inside the venturi, the splitter including inner and outer walls which are joined together at forward and aft ends of the splitter, and are spaced-apart from each other between the forward and aft ends so as to define a splitter cavity, and a plurality of discharge holes communicating with the splitter cavity; an array of outer swirl vanes extending between the venturi and the splitter; a pilot fuel injector disposed within the splitter; and an array of inner swirl vanes extending between the splitter and the pilot fuel injector.

According to another aspect of the invention, the venturi includes, in axial sequence, a generally cylindrical upstream section, a throat of minimum diameter, and a downstream diverging section, wherein the diverging section has a compound angle.

According to another aspect of the invention, the diverging section has an upstream portion having a first divergence angle, and a downstream portion having a second divergence angle different from the first divergence angle.

According to another aspect of the invention, the second divergence angle is less than the first divergence angle.

According to another aspect of the invention, the inner swirl vanes are configured so as to block an axial line-of-sight from a location upstream of the inner swirl vanes to a location downstream of the inner swirl vanes.

According to another aspect of the invention, the inner swirl vanes are at least partially helical.

According to another aspect of the invention, the outer swirl vanes are configured so as to block an axial line-of-sight from a location upstream of the outer swirl vanes to a location downstream of the outer swirl vanes.

According to another aspect of the invention, the outer swirl vanes are at least partially helical.

According to another aspect of the invention, the venturi includes: a pilot housing defining the upstream portion; and an aft heat shield defining the downstream portion.

According to another aspect of the invention, the aft heat shield includes: an annular shield wall, and a conical inner surface; an annular shield flange extending radially outward from an aft end of the shield wall; an annular baffle flange surrounding the shield wall, and disposed such that an axial gap is defined between the shield flange and the baffle flange, the baffle flange including a radially outer rim extending axially forward therefrom; and a plurality of impingement cooling holes passing through the baffle flange and oriented so as to direct air flow towards the shield flange.

According to another aspect of the invention, the shield wall has a counterbore formed therein.

According to another aspect of the invention, a radially inner surface of the counterbore defines a convex-curved land.

According to another aspect of the invention, the shield flange includes opposed, spaced-apart forward and aft faces bounded by an annular outer face, and wherein a convex radius is formed at an intersection of the forward face and the outer face.

According to another aspect of the invention, a row of cooling holes are disposed at a juncture between the radially outer rim and the baffle flange, the cooling holes oriented to direct cooling air towards a radially outer edge of the shield flange.

According to another aspect of the invention, at least one row of cooling holes in the baffle flange are oriented to direct cooling air perpendicular to a forward face of the shield flange.

According to another aspect of the invention, the aft heat shield includes an inner shield disposed within a baffle; the inner shield defines the shield wall and the shield flange; and the baffle includes: the baffle flange; an annular radially inner rim extending axially forward at a radially inner extent of the baffle flange, and contacting the inner shield; and the outer rim extending axially forward at a radially outer extent of the baffle flange.

According to another aspect of the invention, the inner shield and the baffle are metallurgically bonded to each other.

According to another aspect of the invention, the inner shield includes an array of lands which contact the baffle, the lands having a radial array of slots formed therein.

According to another aspect of the invention, the baffle includes a plurality of feed holes communicating with the slots.

According to another aspect of the invention, the slots are curved so as to discharge air with a tangential component of velocity.

According to another aspect of the invention, the slots have a flow area that increases from upstream ends of the slots to downstream ends of the slots.

According to another aspect of the invention, the discharge holes are aligned at an acute angle to the centerline axis.

According to another aspect of the invention, the apparatus further includes: a fuel system operable to supply a flow of liquid fuel at varying flowrates; a pilot fuel conduit coupled between the fuel system and the pilot fuel injector; and a main fuel conduit coupled between the fuel system and the main injection ring.

BRIEF DESCRIPTION OF THE DRAWINGS

The invention may be best understood by reference to the following description, taken in conjunction with the accompanying drawing figures in which.

DETAILED DESCRIPTION OF THE INVENTION

Figure 1:
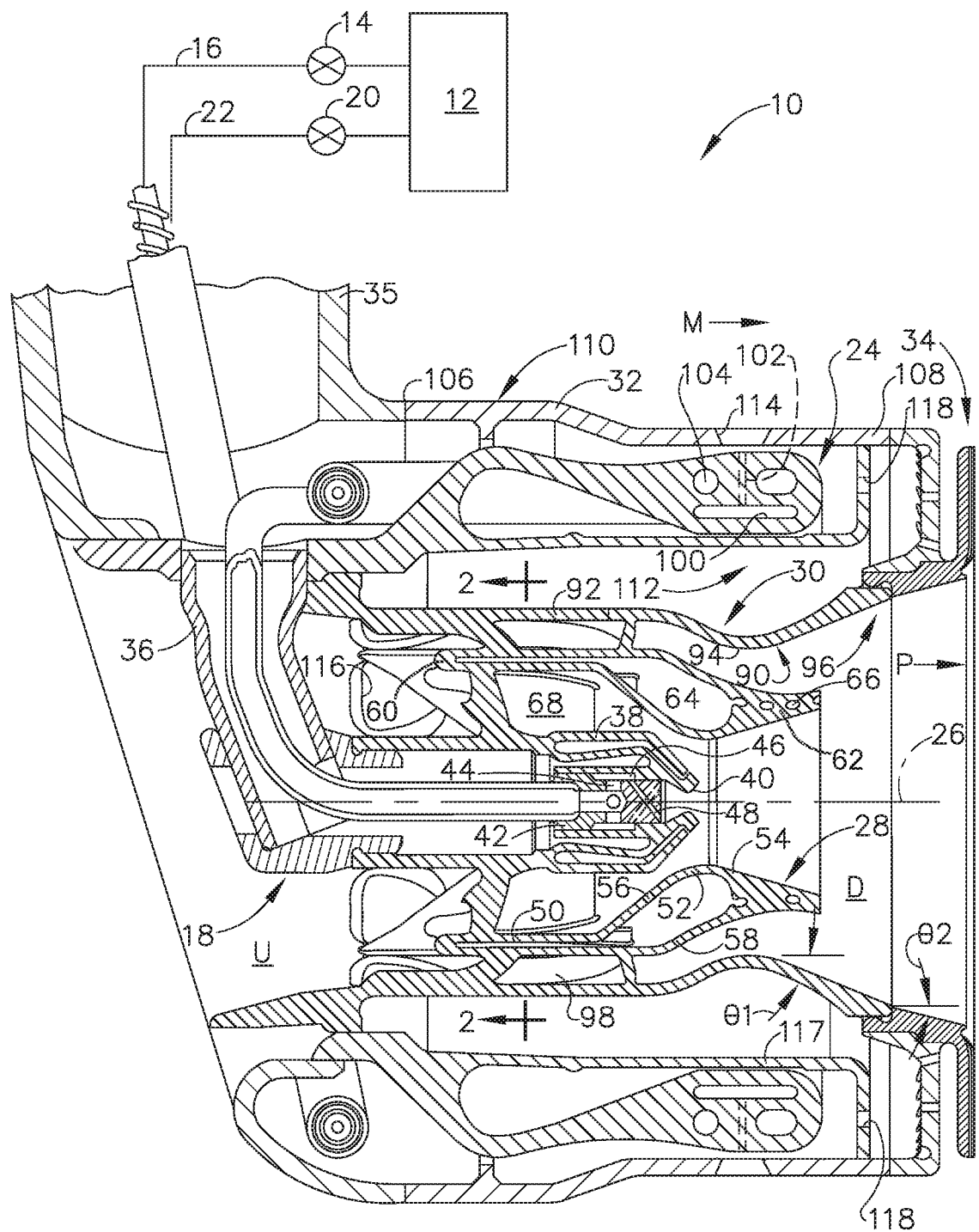
FIG. 1 is a schematic cross-sectional view of a gas turbine engine fuel nozzle constructed according to an aspect of the present invention.
Figure 4:
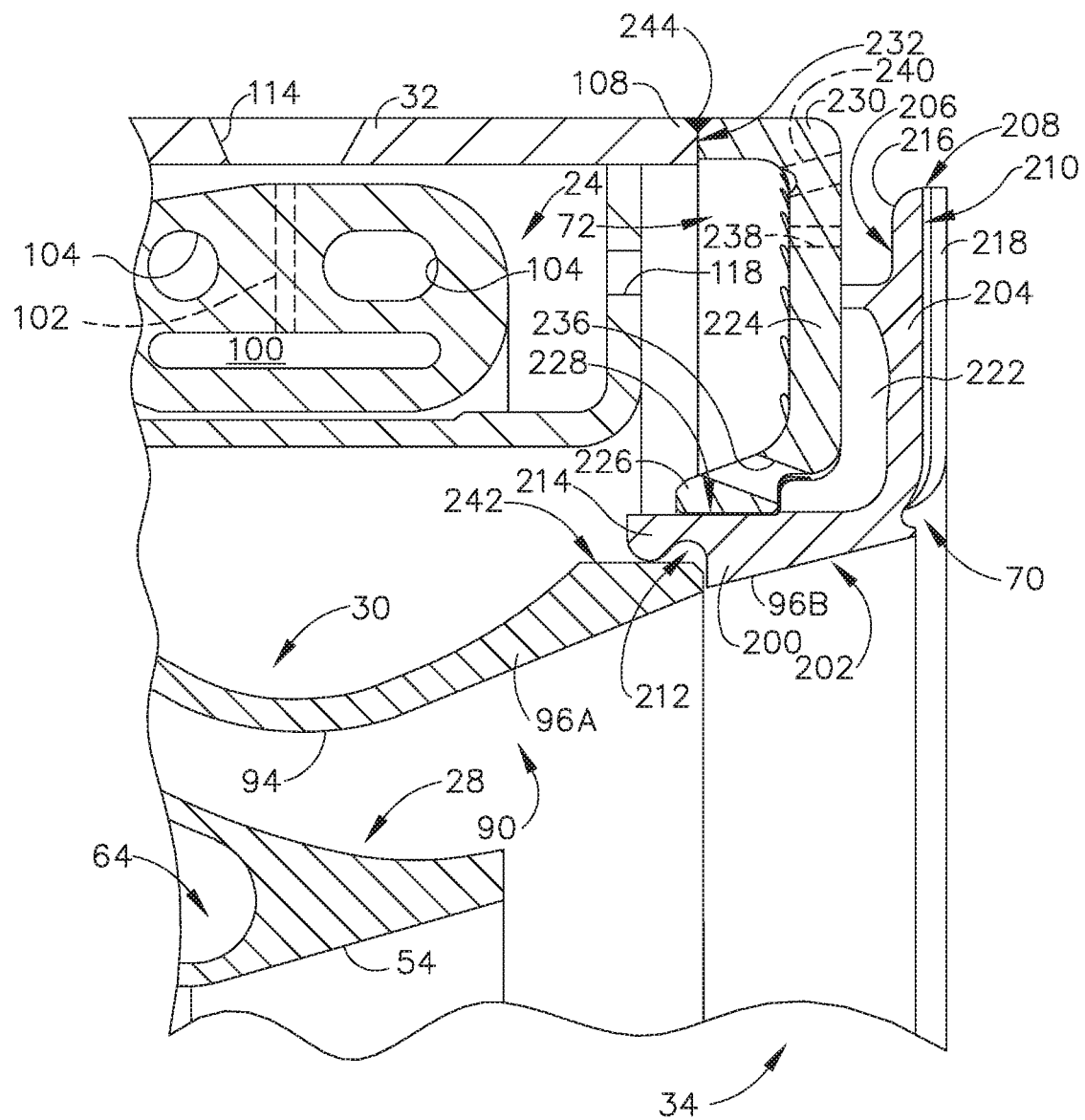
FIG. 4 is an enlarged view of a portion of FIG. 1.

Referring to the drawings wherein identical reference numerals denote the same elements throughout the various views, FIGS. 1 and 4 depict an exemplary fuel nozzle 10 of a type configured to inject liquid hydrocarbon fuel into an airflow stream of a gas turbine engine combustor (not shown). The fuel nozzle 10 is of a "staged" type meaning it is operable to selectively inject fuel through two or more discrete stages, each stage being defined by individual fuel flowpaths within the fuel nozzle 10. The fuel flowrate may also be variable within each of the stages.

The fuel nozzle 10 is connected to a fuel system 12 of a known type, operable to supply a flow of liquid fuel at varying flowrates according to operational need. The fuel system supplies fuel to a pilot control valve 14 which is coupled to a pilot fuel conduit 16, which in turn supplies fuel to a pilot fuel injector 18 of the fuel nozzle 10. The fuel system 12 also supplies fuel to a main control valve 20 which is coupled to a main fuel conduit 22, which in turn supplies a main injection ring 24 of the fuel nozzle 10.

For purposes of description, reference will be made to a centerline axis 26 of the fuel nozzle 10 which is generally parallel to a centerline axis of the engine (not shown) in which the fuel nozzle 10 would be used. Starting from the centerline axis 26 and proceeding radially outward, the major components of the illustrated fuel nozzle 10 are: the pilot fuel injector 18, a splitter 28, a pilot housing 30, the main injection ring 24, an outer body 32, and an aft heat shield 34. Each of these structures will be described in detail.

The pilot fuel injector 18 is disposed at an upstream end of the fuel nozzle 10, aligned with the centerline axis 26 and surrounded by a fairing 36.

The illustrated pilot fuel injector 18 includes a generally cylindrical, axially-elongated, pilot centerbody 38. An upstream end of the pilot centerbody 38 is connected to the fairing 36. The downstream end of the pilot centerbody 38 includes a converging-diverging discharge orifice 40 with a conical exit.

A metering plug 42 is disposed within the pilot centerbody 38. The metering plug 42 communicates with the pilot fuel conduit 16. The metering plug 42 includes transfer holes 44 that flow fuel to a feed annulus 46 surrounding the metering plug 42, and also includes an array of angled metering holes 48 arranged to receive fuel from the feed annulus 46 and distribute it into the spin chamber just upstream of the discharge orifice 40 in a swirling pattern, with a tangential velocity component.

Other types of pilot injectors may be used with the fuel nozzle 10. For example, pilot injectors having two separate fuel flow circuits, referred to as "dual orifice" designs, are known in the art.

Figure 7:
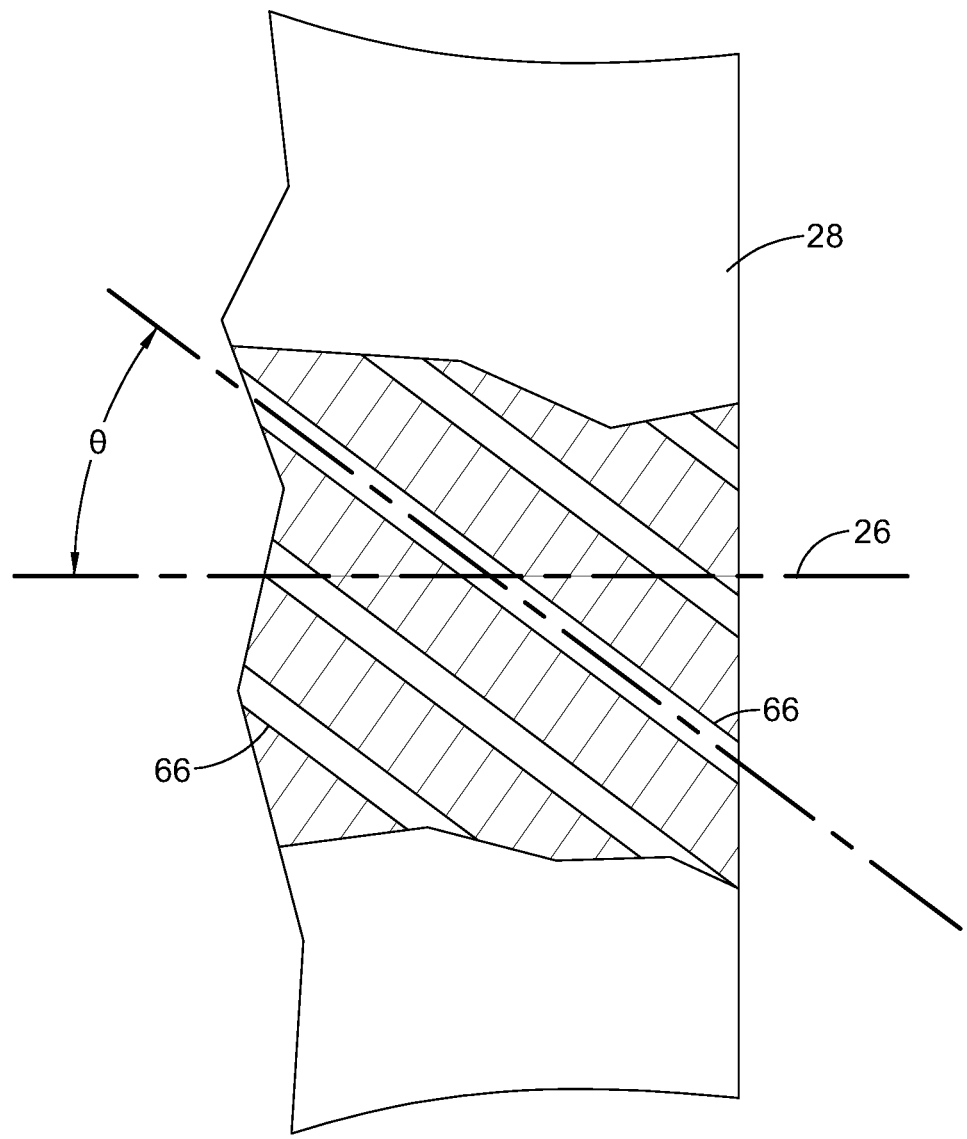
FIG. 7 is an enlarged partially cut away view of FIG. 1.

The annular splitter 28 surrounds the pilot fuel injector 18. It includes, in axial sequence: a generally cylindrical upstream section 50, a throat 52 of minimum diameter, and a downstream diverging section 54. The splitter 28 includes inner and outer walls 56 and 58, respectively. These are joined together at forward and aft ends 60 and 62 of the splitter 28, and are spaced-apart from each other between the forward and aft ends 60, 62 so as to define a splitter cavity 64. A plurality of discharge holes 66 are disposed in the splitter 28 adjacent the aft end 62, and communicate with the splitter cavity 64 and the aft end 62. The discharge holes 66 may be aligned axially or may be aligned at an acute angle to the centerline axis 26. In the illustrated example, the discharge holes 66 are aligned at an acute angle to the centerline axis 26, as shown in FIG. 7, in order to impart a tangential component (i.e. swirl) in the air discharged therefrom. An upstream feed, providing either static or total pressure (not shown) supplies the splitter cavity 64 with air.

Providing the splitter 28 with a purge flow provides a mechanism for heat to be transferred away from the splitter 28. The arrangement of the splitter cavity 64 and the discharge holes 66 is effective to purge the splitter cavity 64 and avoid air recirculation therein without affecting the air flow through the pilot fuel injector 18. The enlarged volume and shape of the splitter cavity 64 upstream of the discharge holes 66 also provide a means for trapping dust entrained in the air flow.

An inner air swirler comprises a radial array of inner swirl vanes 68 which extend between the pilot centerbody 38 and the upstream section 50 of the splitter 28. The inner swirl vanes 68 are shaped and oriented to induce a swirl into air flow passing through the inner air swirler, where "swirl" refers to a flow having both axial and tangential velocity components.

Figure 2:
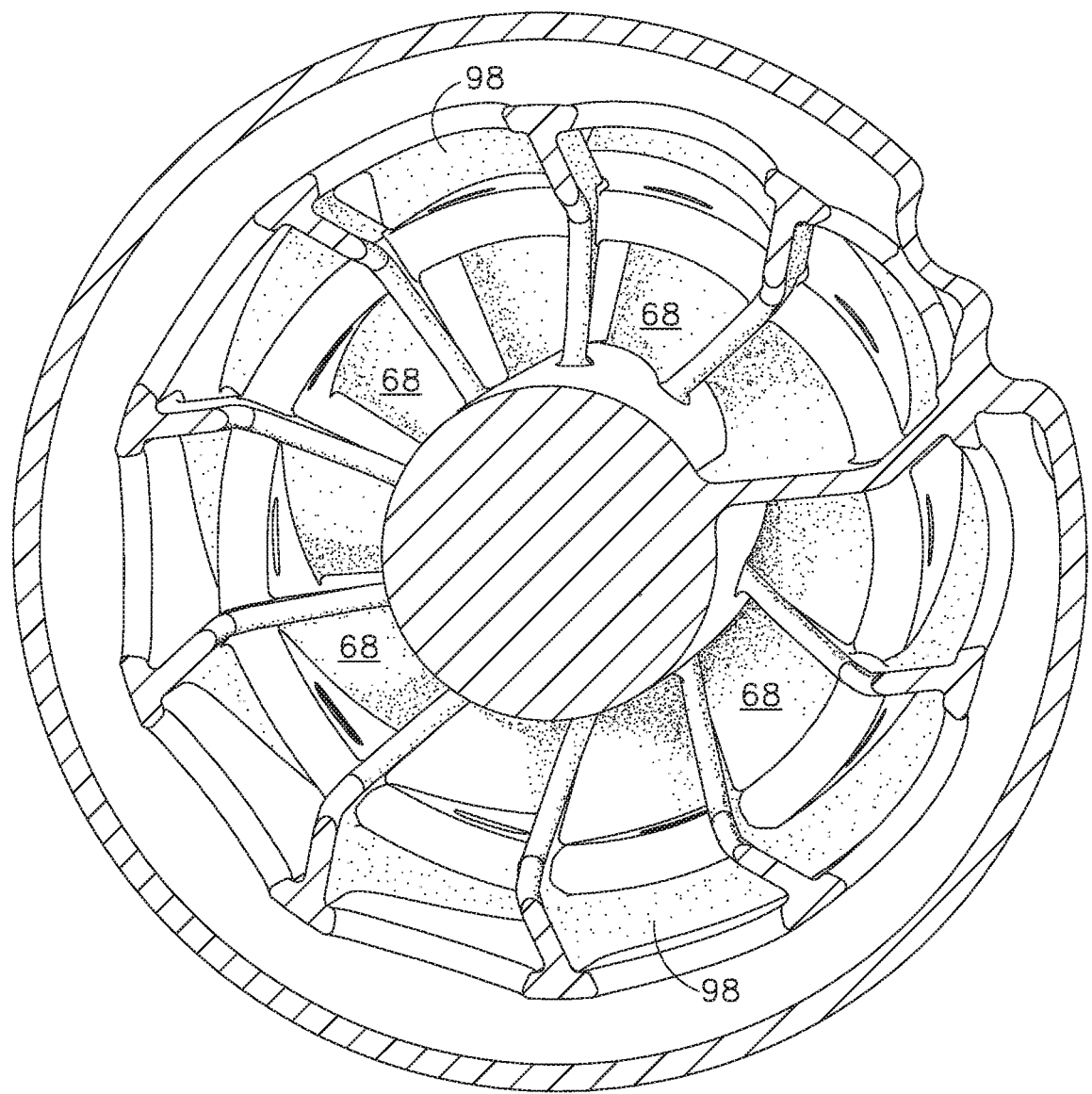
FIG. 2 is a view taken along lines 2-2 of FIG. 1.
Figure 3:
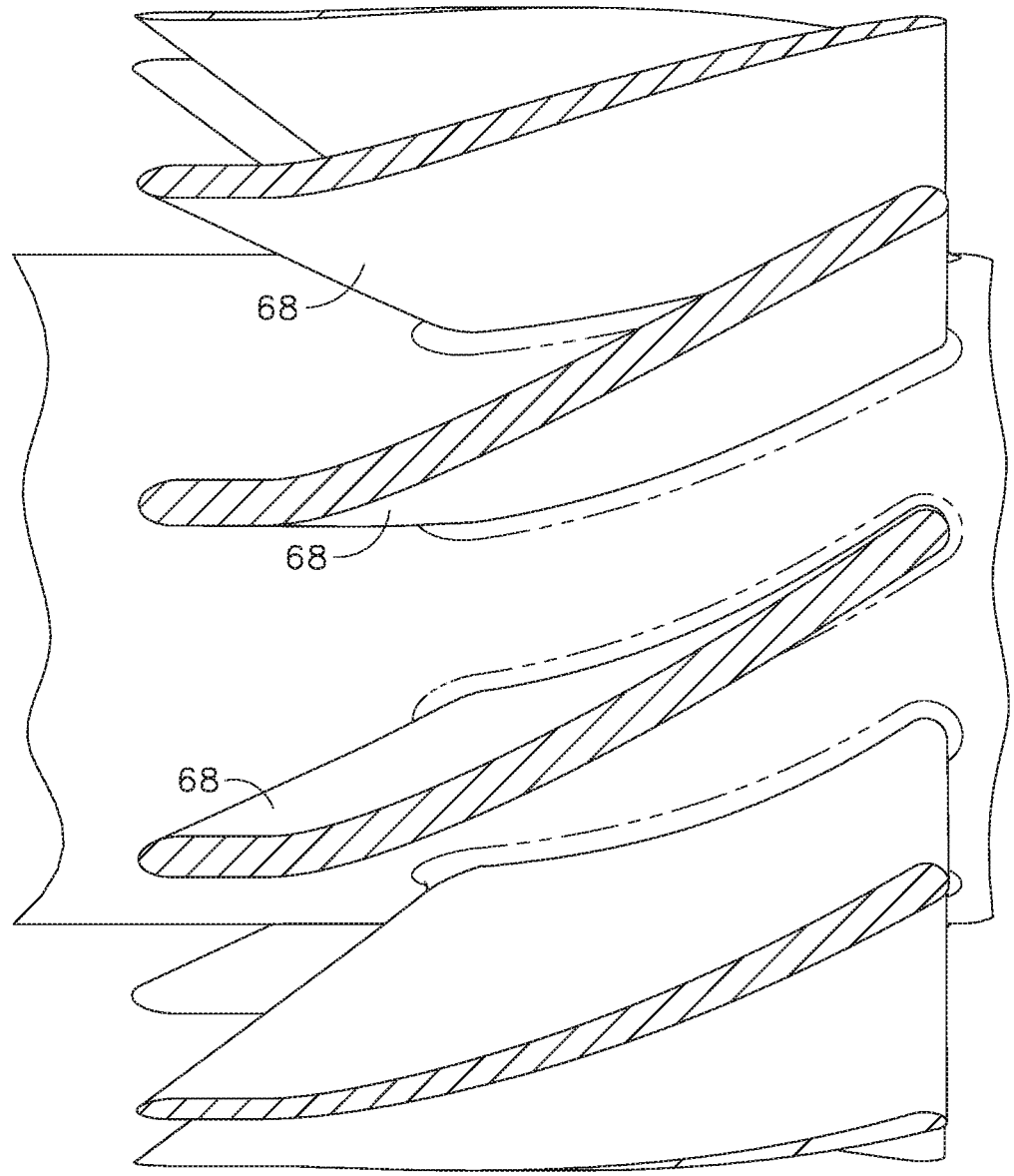
FIG. 3 is a partially-sectioned side view of inner swirl vanes of the nozzle of FIG. 1.

The inner swirl vanes 68 may be configured such that they block the axial line-of-sight from a location "U" upstream of the inner swirl vanes 68 to a location downstream "D" of the inner swirl vanes 68. Stated another way, any arbitrary straight line placed between the pilot centerbody 38 and the splitter 28 and oriented parallel to the centerline axis 26 would have to pass through the structure of one of the inner swirl vanes 68. As seen in FIGS. 2, and 3, the inner swirl vanes 68 may have a helical or partially-helical shape.

The helical shape of the inner swirl vanes 68 vanes reduce drag, while maintaining or increasing swirl compared to non-helical vanes. The shape of the inner swirl vanes also increase impedance to improve acoustics, and prevent combustor gas dynamic patterns from moving upstream.

The annular pilot housing 30 surrounds the splitter 28 and defines a flowpath for a pilot air flow, generally designated "P", through the fuel nozzle 10.

The aft heat shield 34 is coupled to the aft end of pilot housing 30 and to the outer body 32. The aft heat shield 34 includes an inner shield 70 connected to a baffle 72, for example by a metallurgical bond such as brazing.

The inner shield 70 (see FIG. 4) includes an annular shield wall 200 including a conical inner surface 202. An annular shield flange 204 extends radially outward from an aft end of the shield wall 200, and includes a forward face 206, a radially outer face 208, and an aft face 210.

A counterbore 212 extends part way through a front end of the shield wall 200. In the illustrated example, the radially inner surface of the counterbore 212 is formed as a convex-curved fillet or land 214.

A convex radius 216 is formed at the intersection of the forward face 206 and radially outer face 208 of the shield flange 204. A layer of thermal barrier coating 218 of a known type may be bonded to the aft face 210 of the shield flange 204 to provide additional thermal protection for the fuel nozzle 10.

Figure 5:
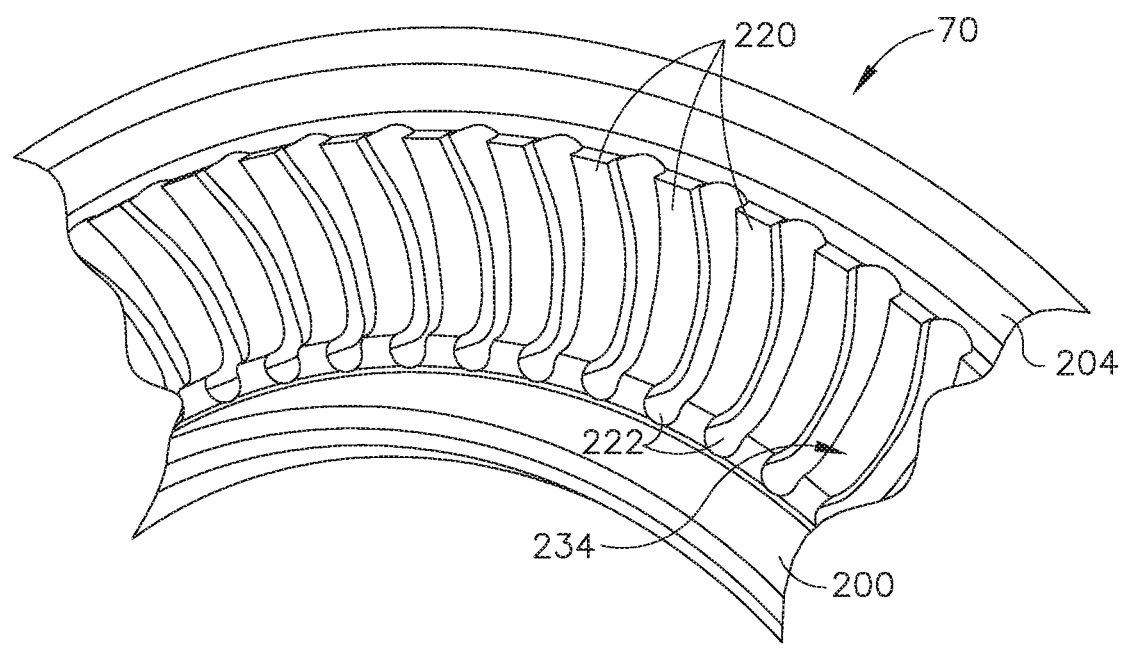
FIG. 5 is a perspective view of a portion of a heat shield seen in FIG. 1.

As best seen in FIG. 5, the shield flange 204 includes an array or row of lands 220 extending axially forward therefrom. The lands 220 are "L"-shaped in side elevation view. A plurality of slots 222 are defined between the lands 220. The slots 222 extend in a generally radial direction. As illustrated, the slots 222 may curve away from a purely radial direction, so as to discharge air with a tangential component of velocity, and may be configured as diffusing passages, with a flow area that increases from their inner or upstream ends to their outer or downstream ends.

The baffle 72 includes an annular, generally radially-extending baffle flange 224. An annular radially inner rim 226 extends axially forward at the radially inner extent of the baffle flange 224, and includes a planar inner surface 228 configured for a metallurgical bond to the inner shield 70. An annular radially outer rim 230 extends axially forward at the radially outer extent of the baffle flange 224, and includes a planar forward surface 232 configured for a metallurgical bond to the fuel nozzle outer body 32, as described in more detail below.

The inner rim 226 and the baffle flange 224 conform to and seal against the faces 234 of the lands 220, effectively closing off the perimeter of the slots 222. A plurality of feed holes 236 extend through the baffle 72 at the intersection of the baffle flange 224 and the inner rim 226. Each feed hole 236 communicates with one of the slots 222.

Figure 6:
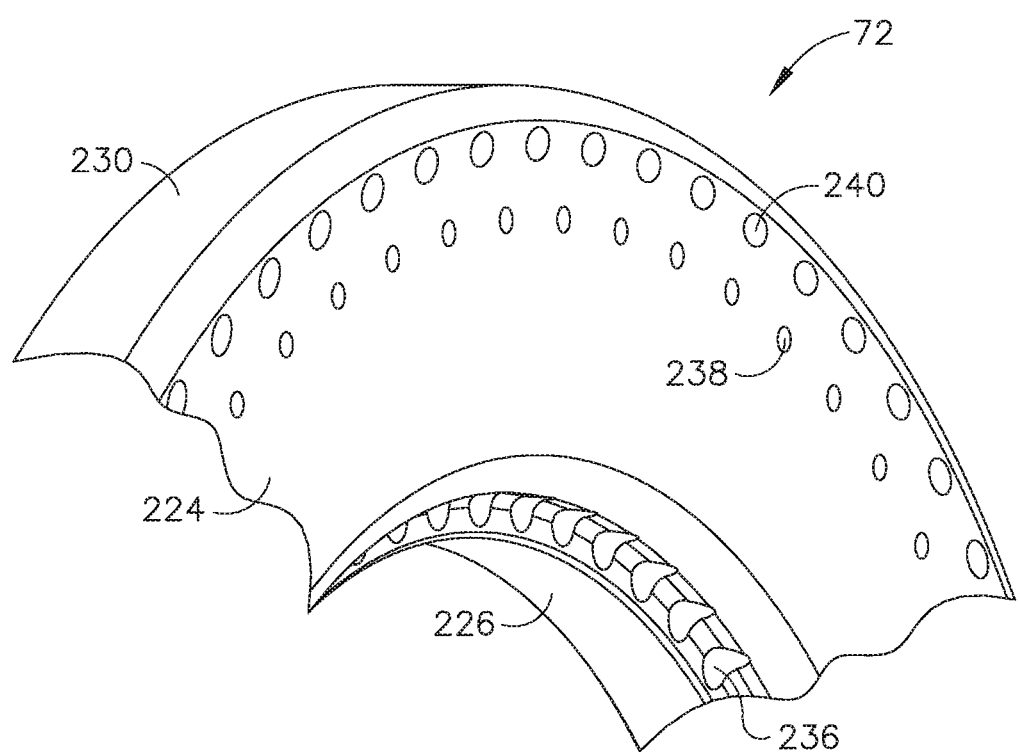
FIG. 6 is a perspective view of another portion of the heat shield of FIG. 1.

As seen in FIGS. 4 and 6, the baffle flange 224 includes a plurality of cooling holes configured with the objective of achieving and even metal temperature distribution and hence minimal induced stress field over the full extent of the shield flange 204, so as to maximize reliability and life of this component. For each specific application the number and position of cooling holes will vary. In the particular example illustrated, the baffle flange 224 includes two annular arrays or annular rows of cooling holes, from an innermost radial position to an outermost radial position.

The first row of holes 238 is positioned and oriented to direct cooling flow at 90 degrees onto the forward face 206 of the shield flange 204 to provide cooling coverage over the majority of the shield flange 204. They extend parallel to the centerline axis 26.

The second row of holes 240 is positioned near the extreme outer diameter of the baffle flange 224, adjacent the radially outer rim 230. This row of holes 240 is oriented outward (i.e. outlet at higher radius than inlet) at an acute angle to the centerline axis 26, so as to defuse the impingement cooling flow that exits through the gap between plates in order to reduce its impact on the local mixer flow field; and to establish circulation of the film cooling air over the outer edge of the shield flange 204 along radius 216 and forward face 206 and to encourage recirculation of this cooling air flow on the aft face 210 of the shield flange 204 near its outer diameter rather than to permit relatively hot combustion products recirculating upstream from the combustion zone into this location.

The aft heat shield 34 may be installed as follows. The counterbore 212 of the aft heat shield 34 may be mounted to the aft end of the pilot housing 30 using a slip fit, with the land 214 contacting a radially outer surface 242 of the pilot housing 30.

After the slip fit is complete, the radially outer rim 230 of the annular baffle flange 224 may be welded or otherwise metallurgically bonded to the aft end 108 of the outer body 32 illustrated at the weld seam 244. A typical welding process (for example, TIG welding or automated MIG welding, which are types of fusion welding) involves a torch, electrode, or other heat source that moves in a path around the circumference of the weld seam 244.

The weld process applies uneven heat circumferentially in the weld zone around the two mating components. This is normal for the weld process. The shrinkage associated with the uneven heating (in a direction perpendicular to the joint plane) can cause the aft heat shield 34 to rotate laterally or distort pilot housing 30 as the weld is completed. Axial binding within the slip joint may occur, depending on the length of overlap and relative radial tolerance between mating features. The shape of the convex land 214 minimizes the chances for binding to occur thereby reducing chances for misalignment or inconsistency in the end gap of the final mated joint.

While the aft heat shield 34 has been shown and described as two pieces, it is also possible that the inner shield 70 and the baffle 72 could be made as one piece.

Collectively, the pilot housing 30 and the aft heat shield 34 define a venturi 90 including, in axial sequence: a generally cylindrical upstream section 92, a throat 94 of minimum diameter, and a downstream diverging section 96. The diverging section 96 has an upstream portion 96A and a downstream portion 96B, with the break between the two portions 96A, 96B defined at the joint between the pilot housing 30 and the aft heat shield 34. A first divergence angle θ1 of the upstream portion (measured relative to the centerline axis 26) is selected for aerodynamic reasons. A second divergence angle θ2 of the downstream portion 96B is selected for other reasons and is different from the divergence angle θ1. In the illustrated example the second divergence angle θ2 is less than the first divergence angle θ1, but the relationship could be reversed. The venturi 90 as a whole may thus be referred to as having a compound angle. In contrast to prior art venturis, the use of the compound angle allows the aerodynamic characteristics of the forward portion of the fuel nozzle 10 and desirable air flow patterns to be preserved while setting the second divergence angle θ2 as required at the aft end of the fuel nozzle 10.

Alternatively, the pilot housing 30 and the aft heat shield 34 (and thus the venturi 90) could be formed as a single integral component.

A radial array of outer swirl vanes 98 defining an outer air swirler extends between the splitter 28 and the pilot housing 30. The outer swirl vanes 98, splitter 28, and inner swirl vanes 68 physically support the pilot fuel injector 18. The outer swirl vanes 98 are shaped and oriented to induce a swirl into air flow passing through the outer air swirler.

The outer swirl vanes 98 may be configured such that they block the axial line-of-sight from a location "U" upstream of the inner swirl vanes 68 to a location downstream "D" of the outer swirl vanes 98. Stated another way, any arbitrary line placed between the splitter 28 and the pilot housing 30 and oriented parallel to the centerline axis 26 would have to pass through the structure of one of the outer swirler vanes 98. As seen in FIG. 2, the outer swirl vanes 98 may have a helical or partially-helical shape.

The main injection ring 24 which is annular in form includes a main fuel gallery 100 which is coupled to and supplied with fuel by the main fuel conduit 22. A radial array of main fuel orifices 102 formed in the main injection ring 24 communicate with the main fuel gallery 100. During engine operation, fuel is discharged through the main fuel orifices 102. Running through the main injection ring 24 closely adjacent to the main fuel gallery 100 are one or more pilot fuel galleries 104. During engine operation, fuel constantly circulates through the pilot fuel galleries 104 to cool the main injection ring 24 and prevent coking of the main fuel gallery 100 and the main fuel orifices 102.

The annular outer body 32 surrounds the main injection ring 24, venturi 90, and pilot fuel injector 18, and defines the outer extent of the fuel nozzle 10. A forward end 106 of the outer body 32 is joined to a stem 35 when assembled, and the aft end 108 of the outer body 32 is joined to the aft heat shield 34 as described above. Extending between the forward and aft ends 106, 108 is a generally cylindrical exterior surface 110 which in operation is exposed to a mixer airflow, generally designated "M." The outer body 32 defines a secondary flowpath 112 (in cooperation with the venturi 90 and with an annular inner body 117 which is disposed radially between the main injection ring 24 and the venturi 90). The secondary flowpath 112 is supplied with air flow through one or more windows 116 formed in the pilot housing 90 upstream of the inner swirl vanes 68. Air passing through this secondary flowpath 112 supplies the holes 236, 238, 240 of the aft heat shield 34.

The outer body 32 includes an annular array of openings 114. Each of the main fuel orifices 102 is aligned with one of the openings 114. Within the fuel nozzle 10, a flowpath is provided for the tip air stream to provide a minimal flow needed to maintain a small pressure margin above the external pressure at locations near the openings 114. In the illustrated example, this flow is provided by small supply holes 118 in the inner body 117, which communicate with the secondary flowpath 112.

The fuel nozzle 10 and its constituent components may be constructed from one or more metallic alloys. Nonlimiting examples of suitable alloys include nickel and cobalt-based alloys.

All or part of the fuel nozzle 10 or portions thereof may be part of a single unitary, one-piece, or monolithic component, and may be manufactured using a manufacturing process which involves layer-by-layer construction or additive fabrication (as opposed to material removal as with conventional machining processes). Such processes may be referred to as "rapid manufacturing processes" and/or "additive manufacturing processes," with the term "additive manufacturing process" being term herein to refer generally to such processes. Additive manufacturing processes include, but are not limited to: Direct Metal Laser Melting (DMLM), Laser Net Shape Manufacturing (LNSM), electron beam sintering, Selective Laser Sintering (SLS), 3D printing, such as by inkjets and laserjets, Sterolithography (SLA), Electron Beam Melting (EBM), Laser Engineered Net Shaping (LENS), and Direct Metal Deposition (DMD).

The fuel nozzle described above has several benefits as compared to the prior art. It provides a means for effective cooling of the splitter and has good aerodynamic and acoustic characteristics. Analysis has shown that the hollow splitter, helical-shaped swirl vanes, and compound-angle venturi are particularly beneficial when used in combination in the fuel nozzle.

The foregoing has described a fuel nozzle for a gas turbine engine fuel nozzle. All of the features disclosed in this specification (including any accompanying claims, abstract and drawings), and/or all of the steps of any method or process so disclosed, may be combined in any combination, except combinations where at least some of such features and/or steps are mutually exclusive.

Each feature disclosed in this specification (including any accompanying claims, abstract and drawings) may be replaced by alternative features serving the same, equivalent or similar purpose, unless expressly stated otherwise. Thus, unless expressly stated otherwise, each feature disclosed is one example only of a generic series of equivalent or similar features.

The invention is not restricted to the details of the foregoing embodiment(s). The invention extends any novel one, or any novel combination, of the features disclosed in this specification (including any accompanying claims, abstract and drawings), or to any novel one, or any novel combination, of the steps of any method or process so disclosed.

What is claimed is:

1. A fuel nozzle apparatus for a gas turbine engine, comprising:
    an annular outer body, the annular outer body extending parallel to a centerline axis, and having an exterior surface extending between a forward end and an aft end, wherein a plurality of openings passes through the exterior surface;
    an annular main injection ring disposed radially inward of the annular outer body, the annular main injection ring including:
        a main fuel gallery extending in a circumferential direction; and
        a plurality of main fuel orifices, each main fuel orifice communicating with the main fuel gallery and aligned with one of the openings of the annular outer body;
    an annular venturi disposed radially inward of the annular main injection ring, the annular venturi comprising a throat having a minimum diameter, a generally cylindrical section upstream of the throat, and a diverging section downstream of the throat;
    an annular splitter disposed radially inward of the annular venturi, the annular splitter including an inner wall and an outer wall which are joined together at a forward end, which converge toward each other to be joined together at an aft end of the annular splitter, and which are spaced-apart from each other between the forward and aft ends so as to define a splitter cavity, wherein an upstream portion of the outer wall has a first contour which converges from the forward end to the aft end and is substantially equal to a second contour of the upstream section of the annular venturi at least as far as the throat;
    an array of outer swirl vanes extending between the annular venturi and the annular splitter, wherein an outer swirl vane passage extends downstream of the outer swirl vanes to an outlet of airflow from the outer swirl vanes, the outlet being defined circumferentially between the annular venturi and the aft end of the annular splitter at an axial location downstream of a throat of the annular venturi;

a pilot fuel injector disposed radially inward of the annular splitter; and an array of inner swirl vanes extending between the annular splitter and the pilot fuel injector, wherein an inner swirl vane passage extends downstream of the inner swirl vanes to an outlet of airflow from the inner swirl vanes, the outlet from the inner swirl vanes being defined by the inner wall of the annular splitter; and wherein a plurality of discharge holes communicating between the splitter cavity and the aft end of the annular splitter is aligned at an acute angle to the centerline axis to impart a swirl in the air discharged therefrom relative to the centerline axis; and wherein the air is discharged from the plurality of discharge holes such that the outlet of airflow from the inner swirler vanes is coincident with a plane.

2. The apparatus of claim 1, wherein the downstream diverging section of the annular venturi comprises a pilot housing defining an upstream portion having a first divergence angle, and an aft heat shield defining a downstream portion having a second divergence angle different from the first divergence angle; wherein the first divergence angle and the second divergence angle create a compound angle; and wherein a fuel nozzle discharge plane is located at a downstream end of a conical inner surface of the aft heat shield, the compound angle being upstream of the fuel nozzle discharge plane.

3. The apparatus of claim 1, wherein the annular shield flange includes a forward face and an aft face bounded by an annular outer face, and wherein a convex radius is formed at an intersection of the forward face and the annular outer face.

4. The apparatus of claim 2, wherein the inner swirl vanes are configured so as to block an axial line-of-sight from a location upstream of the inner swirl vanes to a location downstream of the inner swirl vanes.

5. The apparatus of claim 4, wherein the inner swirl vanes are at least partially helical.

6. The apparatus of claim 2, wherein the outer swirl vanes are configured so as to block an axial line-of-sight from a location upstream of the outer swirl vanes to a location downstream of the outer swirl vanes.

7. The apparatus of claim 6, wherein the outer swirl vanes are at least partially helical.

8. The apparatus of claim 2, wherein the aft heat shield comprises:

an annular shield wall including the conical inner surface;

an annular shield flange extending radially outward from an aft end of the annular shield wall;

an annular baffle flange surrounding the annular shield wall, and disposed such that an axial gap is defined between the annular shield flange and the annular baffle flange, the annular baffle flange including a radially outer rim extending axially forward therefrom; and a plurality of impingement cooling holes passing through the annular baffle flange and oriented so as to direct air flow towards the annular shield flange.

9. The apparatus of claim 8, wherein the annular shield wall has a counterbore formed therein.

10. The apparatus of claim 9, wherein a radially inner surface of the counterbore defines a convex-curved land.

11. The apparatus of claim 8, wherein the annular shield flange includes opposed, spaced-apart a forward face and an aft face bounded by an annular outer face, and wherein a convex radius is formed at an intersection of the forward face and the annular outer face.

12. The apparatus of claim 8, wherein a row of cooling holes is disposed at a juncture between the radially outer rim and the annular baffle flange, the cooling holes oriented radially outwardly and circumferentially to direct cooling air towards a radially outer edge of the annular shield flange.

13. The apparatus of claim 8, wherein at least one row of cooling holes in the annular baffle flange are oriented to direct cooling air perpendicular to a forward face of the annular shield flange.

14. The apparatus of claim 8, wherein:

the aft heat shield comprises an inner shield disposed within a baffle;

the inner shield defines the annular shield wall and the annular shield flange; and the baffle includes:

the annular baffle flange;

an annular radially inner rim extending axially forward at a radially inner extent of the annular baffle flange, and contacting the inner shield; and the radially outer rim extending axially forward at a radially outer extent of the annular baffle flange.

15. The apparatus of claim 14, wherein the inner shield and the baffle are metallurgically bonded to each other.

16. The apparatus of claim 14, wherein the inner shield includes an array of lands which contact the baffle, the lands having a radial array of slots formed therebetween, such that a respective slot is disposed between a pair of adjacent lands of the array of lands.

17. The apparatus of claim 16, wherein the baffle includes a plurality of feed holes communicating with the radial array of slots.

18. The apparatus of claim 16, wherein each slot of the radial array of slots is curved so as to discharge air with a tangential component of velocity.

19. The apparatus of claim 16, wherein each slot of the radial array of slots has a width defined between a respective pair of adjacent lands that increases from a first width at an inlet located at an upstream end of the slot to a second width at an outlet located at a downstream end of the slot, and wherein the flow area increases from the upstream end to the downstream end of the slot due to the continuously increasing width.

20. The apparatus of claim 1, further including:

a fuel system operable to supply a flow of liquid fuel at varying flowrates;

a pilot fuel conduit coupled between the fuel system and the pilot fuel injector; and a main fuel conduit coupled between the fuel system and the annular main injection ring.

* * * * *